United States Patent [19]

Malikowski, Willi et al.

[11] 4,456,662

[45] Jun. 26, 1984

[54] ELECTRICAL CONTACT PIECE

[75] Inventors: Malikowski, Willi, Aschaffenburg; Andreas Szulczyk, Linsengericht; Wolfgang Böhm, Alzenau; Roger Wolmer, Frankfurt, all of Fed. Rep. of Germany

[73] Assignee: Degussa Aktiengesellschaft, Frankfurt am Main, Fed. Rep. of Germany

[21] Appl. No.: 386,265

[22] Filed: Jun. 8, 1982

[30] Foreign Application Priority Data

Jun. 12, 1981 [DE] Fed. Rep. of Germany ....... 3123357

[51] Int. Cl.³ .............................................. B32B 15/00
[52] U.S. Cl. .................................. 428/632; 428/671; 428/673; 228/263.18; 420/501
[58] Field of Search ....................... 428/632, 671, 673; 148/31.5; 420/501, 506; 228/263.18

[56] References Cited

U.S. PATENT DOCUMENTS

| 2,235,634 | 3/1941 | Hensel et al. | 420/501 |
| 3,440,039 | 4/1969 | Lucas . | |
| 3,775,067 | 11/1973 | Backstrom | 428/673 |
| 4,246,321 | 1/1981 | Shibata | 428/673 |
| 4,344,794 | 8/1982 | Szulczyk | 420/502 |

FOREIGN PATENT DOCUMENTS

| 30261 | 6/1981 | European Pat. Off. . | |
| 1033815 | 7/1958 | Fed. Rep. of Germany . | |
| 1090484 | 10/1960 | Fed. Rep. of Germany . | |
| 1187333 | 2/1965 | Fed. Rep. of Germany . | |
| 1232282 | 1/1967 | Fed. Rep. of Germany . | |
| 1803502 | 2/1971 | Fed. Rep. of Germany . | |
| 2147460 | 9/1971 | Fed. Rep. of Germany | 428/673 |
| 2040463 | 1/1973 | Fed. Rep. of Germany | 428/671 |
| 2334160 | 1/1975 | Fed. Rep. of Germany | 420/506 |
| 2365450 | 5/1975 | Fed. Rep. of Germany . | |
| 2417060 | 10/1975 | Fed. Rep. of Germany . | |
| 132358 | 9/1978 | Fed. Rep. of Germany | 428/673 |
| 2745409 | 4/1979 | Fed. Rep. of Germany | 420/504 |
| 2328541 | 5/1977 | France . | |
| 4927219 | 7/1974 | Japan | 420/501 |
| 2030217 | 3/1977 | Japan | 420/501 |
| 23966 | 2/1979 | Japan . | |
| 1438044 | 6/1976 | United Kingdom | 420/501 |

*Primary Examiner*—L. Dewayne Rutledge
*Assistant Examiner*—Christopher W. Brody
*Attorney, Agent, or Firm*—Cushman, Darby & Cushman

[57] ABSTRACT

There is described an electrical contact piece made of a silver-metal oxide material as contact coating, a carrier made of copper, or iron and an intermediate layer which furnishes a high adhesive strength of the contact coating to the contact carrier even at a high number of switchings. The intermediate layer consist essentially of a silver alloy having 2 to 12 weight % of tin, indium, and/or germanium.

23 Claims, No Drawings

ELECTRICAL CONTACT PIECE

BACKGROUND OF THE INVENTION

The invention is directed to an electrical contact piece made of a silver-metal oxide material as contact coating or overlayer, a carrier made of copper or iron and an intermediate layer. Thereby the intermediate layer can serve as solder for joining the contact coating-carrier, or as a solderable layer on the contact piece for soldering to the carrier by means of a conventional solder.

Silver-metal oxide material is employed to a large extent because of its favorable industrial switching properties as contact material in switching having a high number of switchings at low or average current load. The most important members of this composite material-group are silver-cadmium oxide, silver-tin oxide, silver-zinc oxide, and silver-indium oxide.

On account of the high metal oxide content the contact coatings according to the present state of the art are not directly solderable to metallic contact carriers. Therefore for the use as contact material in electrical switching devices the contact coating must be made solderable. For this reason the contact coatings are provided on one side with a layer of a good solderable or weldable metal or metal alloy.

Thus it is known for example, to oxide only one side internally (about 70% of the sheet thickness) of the workpiece consisting of silver alloys and to use the non-oxidized layer as a solderable surface (German AS No. 1033815). However, the process is only usable with silver alloys which can be internally oxidized and are still sufficiently ductile in the oxidized state so that they can be converted into the finished part. With silver alloys which are not sufficiently ductile in the oxidized state the shaping takes place before the oxidation. Thereby the starting material for the production of a solderable layer is plated with silver. The contact coatings are then oxidized as finished parts (German AS No. 2334160 and German AS No. 1803502). However, the silver layer at long oxidation times loses adhesive strength and finished contact coating is detached from the contact carrier in operation. Besides there are formed in the middle of the sample inhomogeneities, such as Kirkendall pores, which under certain circumstances result in a reduced life for the contact coating.

Silver-metal oxide contacts produced by powder metallurgy can be provided with a solderable silver layer by pressing and sintering in common (German AS No. 1187333). However, this process is expensive and only usable with silver-metal oxide contact coatings produced by powder metallurgy.

It is known from German AS No. 1090484 to provide silver-cadmium alloys on one side with a silver solder layer and only then to oxidize internally. However, the process has the disadvantage that it is only usable with internally oxidizable contact materials. Furthermore, metal physical conditioned phenomena here lead to industrial process difficulties which later bring with them working problems in the soldering of the contact piece (e.g. increase of the working temperature of the solder).

In German AS No. 1232282 there is described a soldering process in which the contact surface to be soldered is preliminarily soldered with a tin-lead soft solder and subsequently the contact is soldered with a customary silver hard solder to the contact carrier. The disadvantage of this process is that the parts to be joined must be heated for several minutes to temperatures above the working temperature of the silver-hard solder in order to guarantee a trouble-free joining. If the contact carrier consists of hardened alloys, then the hardening effect can be lost.

Besides it is known (German AS No. 2365450) to back up the silver-metal oxide work material with a solderable silver-copper alloy having 10 or 28% copper and wetting the joining material and subsequently to solder with the contact carrier. Also copper-silver alloys having 8 to 40% silver have been proposed for this purpose (German OS No. 2941423). However, these solderable layers also have not proven sufficiently adhesive with all silver-metal oxide work materials.

Especially the recent preferably used Ag/SnO$_2$ contact work materials having increased SnO$_2$ content permit poor rolled plates. Furthermore, the plated silver has a lower mechanical strength compared to the dispersion hardened contact work material. Through the thermomechanical stresses in the switches there can form already at a low number of switches a tear in the silver which leads to the scaling off of the contact coating.

Compared to silver, plated on copper has an increased strength but in the heat treatments required in the course of the process of production there arise in the transition region between the solderable layer and the Ag/SnO$_2$ layer porous edges. In the course of the switching stresses there runs along the pores a tear which already at a low number of switches likewise can lead to sealing off of the contact coating.

Reactive solders which contain phosphorus (German OS No. 2438922 through reduction of the SnO2 likewise produce pore formation. In the switching experiments this type of presoldered or soldered contact coatings fall off at corresponding loads through separations in the region of the damaged zone.

Therefore, it was the problem of the present invention to find an electrical contact piece made of a silver-metal oxide work material as contact coating, a carrier made of copper or iron and an intermediate layer which also furnishes a sufficient adhesive strength of the contact coating to the contact carrier at a high number of switches.

SUMMARY OF THE INVENTION

This problem was solved according to the invention by employing an intermediate layer made of a silver alloy with 2 to 12 weight % of tin, zinc, indium and/or germanium, balance silver.

In backing up such alloys to silver-metal oxide work materials, especially silver-tin oxide there results a solid adhesion of the cast on layer to the contact work material. Brittle phases, which lead to premature separation from the carrier, do not occur. In spite of the fact that there is no reduction of the SnO$_2$ surprisingly, however, a good wetting of the surface of the contact work material Ag/SnO$_2$ occurs. Unexpectedly the in part higher melting point of the alloys employed, compared with Ag-Cu eutectics makes no difficulties in the processing and in the mechanical properties.

In addition to tin oxide, other suitable metal oxides include cadmium oxide, lead oxide, zinc oxide and indium oxide. The silver-metal oxide can contain for example 8 to 15% of metal oxide.

To adjust the working temperature of the alloys on the contact work material advantageously without effect on the zone of joining there can be alloyed in further additives so long as their content is below 10 weight %. The additives can be cadmium and/or copper and/or lead. An addition of lithium (maximum 0.5 weight %) likewise reduces the melting point and causes necessary wetting.

To avoid brittle phases at the transition zone to the contact work material the tin, indium and germanium concentration is limited to a maximum of 12 weight %. Since through grain-boundary diffusion there can take place an enrichment of the alloying elements at the large-angle grain boundary, there has been found as a particularly favorable concentration range 6 to 10 weight % tin and/or indium and/or germanium. Through this there is avoided an embrittlement of the $Ag/SnO_2$ contact work material in the vicinity of the backing intermediate layer. Through this mode of action because of the elimination of the detachment of the contact coating there results a complete utilization of the contact material. This leads to a clearly higher number of switchings in the switching device.

This intermediate layer can be directly melted with the contact carrier, that is, it can also serve as the solder, or advantageously be soldered with a customary hard solder to the contact carrier.

Unless otherwise indicated all parts and percentages are by weight.

The electrical contact piece can comprise, consist essentially of, or consist of the stated materials and the intermediate layer can consist essentially of or consist of the stated materials.

The following examples more closely characterize the electrical contact piece of the invention.

DETAILED DESCRIPTION

EXAMPLE 1

$Ag/SnO_2$ containing 12 weight % of $SnO_2$ produced by powder metallurgy was backed with silver alloys having 6 weight % of tin or indium or germanium under nitrogen at 950° C. by applying a surface contact film. The thus produced solderable contact coating can be soldered on a steel carrier with hard solder (e.g. L-Ag 45 Cd).

EXAMPLE 2

After mechanical purification of the surface internally oxidized AgSnIn was backed up with AgSn8, AgIn8 or AgGe6 by melting a wire at 950° C. under nitrogen and soldered with hard solder L-Ag45Cd to a copper contact carrier.

EXAMPLE 3

$Ag/SnO_2$ containing 12 weight % of $SnO_2$ produced by powder metallurgy was backed with AgSnGe 90/9/1 or AgSnIn 90/9/1 or AgSnPb 90/9/1 under nitrogen at 830° to 870° C. by applying a surface contact film. Subsequently the now solderable silver-tin oxide contact can be soldered with a hard solder L-Ag40Cd or L-Ag45Cd according to DIN 8513 (German Industrial Standard 8513) onto a contact carrier made of copper or iron.

All of the thus produced contact pieces in the switching experiments showed an excellent adhesive strength of the contact coating to the contact carrier. There did not occur contact separations or tears even after a very high number of switchings.

The entire disclosure of German priority application No. P 3123357.0 is hereby incorporated by reference.

What is claimed is:

1. In an electrical contact piece comprising a silver-metal oxide work material as the contact coating, a copper or iron carrier and an intermediate layer the improvement comprising employing as the intermediate layer a silver alloy consisting essentially of (a) 2 to 12 weight % of at least one member of the group consisting of tin, indium and germanium and (b) silver.

2. An electrical contact piece according to claim 1 wherein the intermediate layer consists of at least one member of the group consisting of tin, indium and germanium.

3. An electrical contact piece accoring to claim 1 wherein the silver alloy contains tin.

4. An electrical contact piece according to claim 1 wherein the silver alloy contains indium.

5. An electrical contact piece according to claim 1 wherein the silver alloy contains germanium.

6. An electrical contact piece according to claim 1 wherein the silver alloy contains 6 to 10 weight % at least one member of the group consisting of tin, indium, and germanium.

7. In an electrical contact piece comprising a silver-metal oxide work material as the contact coating, a copper or iron carrier and an intermediate layer, a silver alloy consisting essentially of (a) 2 to 12 weight % of at least one member of the group consisting of tin, indium and germanium, (b) silver and (c) lead, the amount of lead in the alloy being up to 10 weight %.

8. An electrical contact piece according to claim 7 wherein the amount of lead in the alloy is 1 to 10 weight %.

9. An electrical contact piece according to claim 7 wherein the silver alloy contains 6 to 10 weight % of at least one member of the group consisting of tin, indium and germanium.

10. In an electrical contact piece comprising a silver-metal oxide work material as the contact coating, a copper or iron carrier and an intermediate layer, a silver alloy consisting essentially of (a) 2 to 12 weight % of at least one member of the group consisting of tin, indium and germanium, (b) silver and (c) lithium, the amount of lithium being up to 0.5 weight %.

11. An electrical contact piece according to claim 10 wherein the silver alloy contains 6 to 10 weight % of at least one member of the group consisting of tin, indium and germanium.

12. An electrical contact piece according to claim 1 wherein the intermediate layer is soldered to the carrier with a hard solder.

13. An electrical contact piece according to claim 6 wherein the intermediate layer is soldered to the carrier with a hard solder.

14. An electrical contact piece according to claim 7 wherein the intermediate layer is soldered to the carrier with a hard solder.

15. An electrical contact piece according to claim 10 wherein the intermediate layer is soldered to the carrier with a hard solder.

16. An electrical contact piece according to claim 1 wherein the contact coating consists of silver-tin oxide.

17. An electrical contact piece according to claim 6 wherein the contact coating consists of silver-tin oxide.

18. An electrical contact piece according to claim 7 wherein the contact coating consists of silver-tin oxide.

19. An electrical contact piece according to claim 10 wherein the contact coating consists of silver-tin oxide.

20. An electrical contact piece according to claim 12 wherein the contact coating consists of silver-tin oxide.

21. An electrical contact piece according to claim 13 wherein the contact coating consists of silver-tin oxide.

22. An electrical contact piece according to claim 14 wherein the contact coating consists of silver-tin oxide.

23. An electrical contact piece according to claim 15 wherein the contact coating consists of silver-tin oxide.

* * * * *